May 8, 1923.

C. R. CARLETON

SPROCKET WHEEL

Original Filed Oct. 13, 1919

1,454,536

WITNESSES

INVENTOR
CHARLES R. CARLETON.
BY
ATTORNEYS

Patented May 8, 1923.

1,454,536

UNITED STATES PATENT OFFICE.

CHARLES R. CARLETON, OF BROOKLYN, NEW YORK.

SPROCKET WHEEL.

Original application filed October 13, 1919, Serial No. 330,177. Divided and this application filed May 1, 1920, Serial No. 378,333. Renewed April 7, 1922. Serial No. 550,510.

*To all whom it may concern:*

Be it known that I, CHARLES R. CARLETON, a citizen of the United States, and a resident of the city of New York, borough of Brooklyn, in the county of Kings and State of New York, have invented a new and Improved Sprocket Wheel, of which the following is a full, clear, and exact description.

This invention relates to improvements in sprocket wheels, and more particularly to sprockets such as are used in connection with motion picture films, an object of the invention being to provide a device of the character stated with removable teeth carrying portions so that such portions can be readily replaced or interchanged as may be desired.

This application is filed as a division of my original application for improvements in film cleaning and polishing machines, filed October 13, 1919, and given Serial No. 330,177.

With these and other objects in view the invention consists in certain novel features of construction, and combinations and arrangements of parts, as will be more fully hereinafter described and pointed out in the claims.

In the accompanying drawings—

Figure 1:
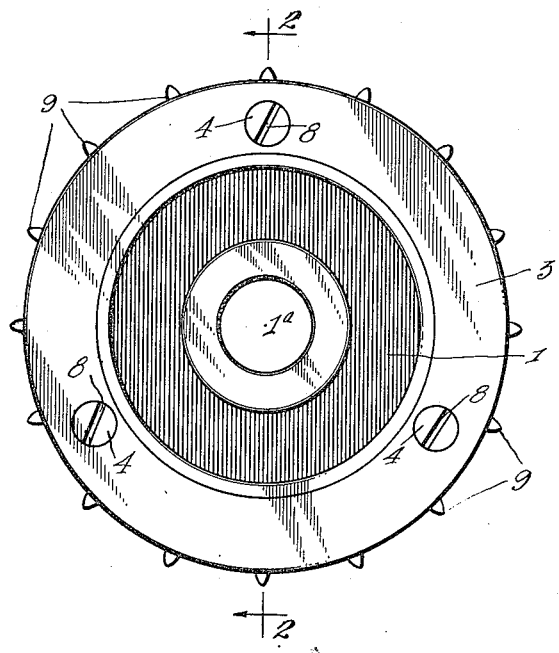
Figure 1 is a view in end elevation illustrating my improved sprocket wheel.
Figure 2:
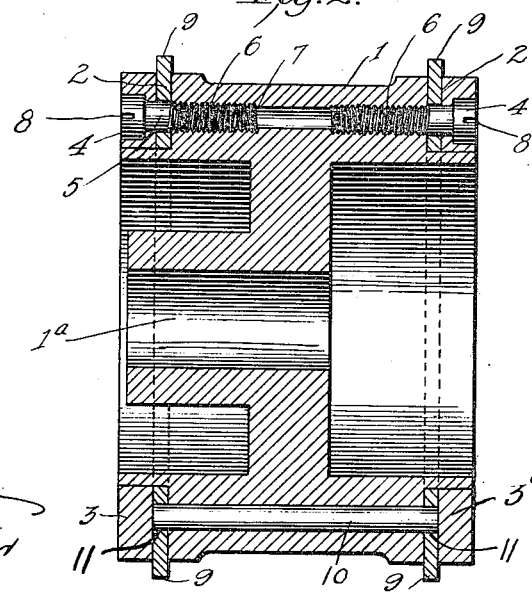
Figure 2 is a view in section on the line 2—2 of Figure 1.

1 represents the spool or body of my improved sprocket wheel and 2, 2, are rings secured to the ends of the body 1 by means of clamping rings 3. The body 1 is provided with a central spindle receiving sleeve or bearing 1ª and is made substantially hollow to reduce weight to a minimum.

The parts are secured together by means of screws 4, said screws having smooth portions 5 which project through the rings 3 and 2 and have threaded portions 6 at their inner ends which engage in screw threaded openings 7 in the drum or body 1. The outer ends or heads of the screws 4 are preferably countersunk and provided with ordinary screwdriver receiving grooves 8 for the reception of a screwdriver to adjust the same.

The rings 2 are preferably of a metal differing from the metal of the other parts of the sprocket wheel and are provided on their peripheries with annular series of sprocket teeth 9 projecting beyond the outer face or periphery of the body or spool 1.

In order that the teeth 9 of the rings 2 may properly register and prevent possibility of their improper connection with the body 1, a pin 10 is projected through and has a fixed relationship to the body 1 with its ends projecting slightly beyond the ends of the body and adapted to enter openings 11 in the rings 2. Hence, these rings 2 can be positioned against the body only when their openings 11 are in register with the ends of the pin 10 and when in such position, the teeth 9 of the pair of rings will be in proper relative positions.

When the teeth 9 are worn, or when it is desired to provide the sprocket wheel with other shape or form of teeth, the rings 2 can be readily removed by first removing the screws 4 and new rings 2 with the proper teeth, or simply with the same form of teeth, may be clamped in place as above described.

It will thus be noted that with my improved sprocket wheel, I am enabled to utilize the same spool or body as the only portion of the sprocket wheel which has any material wear is the teeth, and when the teeth are worn, new rings can be clamped in place, so that the expense of providing new sprocket wheels is entirely dispensed with.

It is, of course, to be understood that this form of sprocket wheel is to be utilized in any connection where it is desired to move a film or other analogous device, and I do not limit myself to any particular use.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

A sprocket wheel, comprising a body having reduced ends, a pin extending axially through the body with its ends projecting beyond the reduced ends of the body, a pair of teeth carrying rings removably positioned on the reduced ends of the body and having openings therein receiving the ends of the pin to maintain the teeth of the rings in alignment, securing rings on the reduced ends of the body covering the openings and the ends of the pin and located against the first-mentioned rings, and screws projected through the pairs of rings at the respective ends of the body and screwed into the body removably clamping the parts together.

CHARLES R. CARLETON.